United States Patent [19]

Kawahara

[11] 4,370,383

[45] Jan. 25, 1983

[54] MAGNETIC RECORDING MEDIUM

[75] Inventor: Hiroshi Kawahara, Tokyo, Japan

[73] Assignee: TDK Electronics Co., Ltd., Tokyo, Japan

[21] Appl. No.: 207,899

[22] Filed: Nov. 18, 1980

[30] Foreign Application Priority Data

Jan. 22, 1980 [JP] Japan ................................. 55-5271

[51] Int. Cl.³ .............................................. G11B 5/70
[52] U.S. Cl. .................................. 428/425.9; 360/134; 252/62.54; 427/128; 428/694; 428/900
[58] Field of Search ................... 428/425.9, 900, 694, 428/695; 252/62.54; 427/128; 360/134, 135, 136

[56] References Cited

U.S. PATENT DOCUMENTS

| 3,926,826 | 12/1975 | Graham | 252/62.54 |
| 4,058,646 | 11/1977 | Vaeth et al. | 478/900 |
| 4,068,040 | 1/1978 | Yamada et al. | 428/425.9 |
| 4,263,188 | 4/1981 | Hampton | 427/128 |
| 4,284,750 | 8/1981 | Amirsakis | 428/425.9 |

FOREIGN PATENT DOCUMENTS 5131484 2/1976 Japan ................................. 427/128

Primary Examiner—Stanley S. Silverman
Attorney, Agent, or Firm—Oblon, Fisher, Spivak, McClelland & Maier

[57] ABSTRACT

A urethane resin comprising the reaction product of a $C_4$-$C_8$ alkylenediisocyanate as an isocyanate component and a $C_3$-$C_{12}$ alkyleneglycol as a polyol component is used as a rubber component for a binder in a magnetic layer of a magnetic recording medium.

6 Claims, No Drawings

MAGNETIC RECORDING MEDIUM

BACKGROUND OF THE INVENTION

Field of the Invention

Recently, the uses of magnetic tapes have been developed as an audio cassette tape and a home VTR tape in many countries in the world. Therefore, the magnetic tapes have been used in severe conditions. It has been usually blend a rubber component to a resin component as a binder for a magnetic tape because desired flexibility and adhesiveness can not be provided only by a resin component. The rubber component usually has inferior physical characteristics and accordingly, a rubber component having superior physical characteristics should be used. Certain aromatic polyurethanes having relatively superior physical characteristics have been used, however, such aromatic polyurethanes have inferior dispersibility for a magnetic powder and accordingly, the polyurethanes have not been satisfactory in view of electromagnetic characteristics.

SUMMARY OF THE INVENTION

It is an object of the present invention to provide a magnetic recording medium using an urethane resin which has improved electromagnetic characteristics together with desired physical characteristics of the urethane resin.

The foregoing and other objects of the present invention have been attained by providing a magnetic recording medium prepared by using an urethane resin made of a $C_4$–$C_8$ alkylenediisocyanate as an isocyanate component and a $C_3$–$C_{12}$ alkyleneglycol as a polyol component.

DETAILED DESCRIPTION OF THE PREFERRED EMBODIMENTS

The conventional polyurethanes used for a magnetic tape are mainly aromatic polyurethanes such as MDI (diphenylmethanediisocyanate) type or TDI (tolylenediisocyanate) type polyurethanes. When these aromatic polyurethanes are used, dispersibility of the magnetic powder is inferior to give certain inferior electromagnetic characteristics though physical characteristics such as durability and temperature characteristics are superior. On the other hand, the uses of aliphatic polyurethanes such as polyurethane made of hexamethylenediisocyanate HMDI and diethyleneglycol have been studied. When these aliphatic polyurethanes are used, dispersibility of the magnetic powder is not inferior, however, physical characteristics such as durability and temperature characteristics are inferior. As a result of various studies for the reasons, it has been found that when MDI type or TDI type polyurethane is used, the dispersibility of a magnetic powder is inferior because of its molecular structure whereas the physical characteristics is superior because of crystallinity resulted by the combination of the alkylenepolyol. On the other hand, when HMDI type polyurethane is used, the dispersibility of a magnetic powder is not inferior because of the straight chain of the isocyanate component whereas the physical characteristics is inferior because of low crystallinity resulted by the combination of the diethyleneglycol and excess softeness.

It has been found that when the urethane resin made of a $C_4$–$C_8$ alkylenediisocyanate as the isocyanate component and a $C_3$–$C_{12}$ alkyleneglycol as the polyol component is used as an additive for a binder of a magnetic recording medium, a magnetic recording medium having excellent balanced characteristics of the dispersibility, the electromagnetic characteristics and the physical characteristics can be obtained.

The urethane resins used for the preparation of the magnetic recording medium are produced by using a $C_4$–$C_8$ alkylenediisocyanate as the isocyanate component and a $C_3$–$C_{12}$ alkyleneglycol as the polyol component. When the isocyanate component has an alkyl group having carbon atoms of 3 or less or 9 or more, excess softness is imparted whereas when the polyol component has an alkyl group having carbon atoms of 2 or less, excess softness is imparted.

Suitable alkylenediisocyanates include butylenediisocyanate, pentamethylenediisocyanate, hexamethylenediisocyanate and octamethylenediisocyanate.

Suitable alkyleneglycols include propyleneglycol, 1,4-butanediol, 1,5-pentanediol, 1,6-hexanediol, 1,8-octanediol and 1,10-decanediol.

The urethane resins used in the present invention can have free isocyanate group and/or hydroxyl group or have not such reactive terminal groups, such as an urethane elastomer. It is optimum to use an urethane prepolymer. The urethane prepolymers are intermediates having terminal isocyanate groups and/or hydroxyl groups at a desired ratio which are obtained by reacting the polyol component with the diisocyanate component. Therefore, the urethane prepolymer should be cured by heating or curing with a desired crosslinking agent. In the preparation of the magnetic recording medium of the present invention, it is preferable to use the urethane prepolymer in view of easy handling and easy preparation of the magnetic recording medium.

The productions of an urethane resin, an urethane prepolymer and an urethane elastomer and the curing by crosslinking are well-known. Therefore, the description of the preparations and the curing method is not recited.

In the preferable embodiment of the preparation of the magnetic recording medium of the present invention, an urethane prepolymer is used as the urethane resin. When the urethane prepolymer is used, a magnetic recording medium can be prepared as follows.

The urethane prepolymer, a magnetic powder (such as $\gamma$-$Fe_2O_3$, cobalt-adsorbed magnetic powder and magnetite magnetic powder), a binder resin component (such as vinyl chloride-vinyl acetate copolymer, vinyl chloride-vinylidene chloride copolymer, vinyl chloride-acrylonitrile copolymer and nitrocellulose), a dispersing agent (such as lecithin) and a solvent (such as ketones such as methyl ethyl ketone and ethyl isobutyl ketones and aromatic hydrocarbons such as benzene, toluene and xylene) are thoroughly kneaded in a ball mill etc. to obtain a homogeneous mixture. Then, a crosslinking agent (such as an polyisocyanate Colonate L. manufactured by Nippon Polyurethane Co.) is added to the mixture and the mixture is uniformly mixed. The resulting magnetic component is coated on a base substrate such as a polyester film to give a dry thickness of 4.0 to 7.0$\mu$. The product is treated to give orientation of the magnetic powder and dried and surface-processed. The dried film is heat-treated at a desired temperature for a desired time to cure the urethane resin by crosslinking to obtain a magnetic recording tape.

The present invention will be illustrated by certain examples and references which are provided for purposes of illustration only and are not intended to be limiting the present invention.

EXAMPLE 1

| | |
|---|---|
| Magnetic powder: γ-FeO₃ | 100 wt. parts |
| Vinyl chloride-vinyl acetate copolymer | 10 " |
| Urethane prepolymer made of hexamethylenediisocyanate and 1,4-butanediol | 10 " |
| Dispersing agent: lecithin | 2 " |
| Methyl ethyl ketone | 80 " |
| Methyl isobutyl ketone | 80 " |
| Toluene | 80 " |

The components were charged in a ball mill and thoroughly kneaded for 6 hours, and then, 3 wt. parts of a polyisocyanate (Colonate L. manufactured by Nippon Polyurethane Co.) as a cross-linking agent was admixed to prepare a magnetic composition. The magnetic composition was coated on a polyester film to give a dry thickness of 4.0 to 7.0μ. The coated product was treated to give orientation of the magnetic powder and dried and surface-processed and then, heat-treated at 60° C. for 48 hours to cure the urethane resin by crosslinking to obtain a magnetic recording tape.

EXAMPLE 2

| | |
|---|---|
| Magnetic powder: γ-Fe₂O₃ | 100 wt. parts |
| Vinyl chloride-vinyl acetate copolymer | 10 " |
| Urethane prepolymer made of hexamethylenediisocyanate and 1,6-hexanediol | 10 " |
| Dispersing agent: lecithin | 2 " |
| Methyl ethyl ketone | 80 " |
| Methyl isobutyl ketone | 80 " |
| Toluene | 80 " |

In accordance with the process of Example 1, the components were uniformly kneaded and the crosslinking agent of polyisocyanate was admixed to prepare a magnetic composition and the magnetic composition was coated on a polyester film to obtain a magnetic recording tape.

REFERENCE 1

| | |
|---|---|
| Magnetic powder: γ-Fe₂O₃ | 100 wt. parts |
| Vinyl chloride-vinyl acetate copolymer | 10 " |
| Conventional urethane prepolymer made of MDI and 1,4-butanediol | 10 " |
| Dispersing agent: lecithin | 2 " |
| Methyl ethyl ketone | 80 " |
| Methyl isobutyl ketone | 80 " |
| Toluene | 80 " |

In accordance with the process of Example 1, the components were used to prepare a magnetic recording tape.

REFERENCE 2

In accordance with the process of Example 1 except that 10 wt. parts of the conventional urethane prepolymer made of TDI and 1,4-butanediol was used instead of the urethane prepolymer, a magnetic recording tape was prepared.

REFERENCE 3

In accordance with the process of Example 1 except that 10 wt. parts of an urethane prepolymer made of hexamethylenediisocyanate and diethyleneglycol was used instead of the urethane prepolymer, a magnetic recording tape was prepared.

The characteristics of the magnetic recording tapes prepared in Examples 1 and 2 and References 1, 2 and 3 were measured by the following test methods.

Dispersibility:

The dispersibility is evaluated from orientation degree.

Electromagnetic characteristics:

The electromagnetic characteristics are measured by a tester of Nakamichi 100 II using a TDK alinement tape as a reference tape.

Friction coefficient:

The friction coefficient is measured as tension of a tape in running under a constant load.

Running durability:

The running durability is measured as a ratio of defects (sound and stop) in running at high temperature in high humidity.

Magnetic powder falling:

The magnetic powder falling is rated by 5 ratings for degree of the magnetic powder falling after running for 150 times.

The results are as follows.

TABLE

| | Exp. 1 | Exp. 2 | Ref. 1 | Ref. 2 | Ref. 3 |
|---|---|---|---|---|---|
| Orientation degree | 2.7 | 2.8 | 2.1 | 2.2 | 2.7 |
| Electromagnetic characteristics: | | | | | |
| S-333 (dB) | +2.6 | +2.5 | +1.9 | +1.8 | +2.2 |
| S-16K (dB) | +3.0 | +3.2 | +0.7 | +0.5 | +2.5 |
| Physical characteristics: | | | | | |
| Friction coefficient | 0.23 | 0.25 | 0.22 | 0.23 | 0.45 |
| Running durability | 0/5 | 0/5 | 1/5 | 0/5 | 4/5 |
| Magnetic powder falling | 5 | 4 | 3 | 3 | 4 |

As a result, the following facts are found. The magnetic recording tapes prepared by using the conventional urethane resins as References 1 and 2 had superior physical characteristics, but had inferior dispersibility and inferior electromagnetic characteristics. The magnetic recording tape of Reference 3 had superior dispersibility and electromagnetic characteristics, but had inferior physical characteristics.

On the other hand, the magnetic recording tapes prepared by using the special urethane resins according to the present invention had excellent superior balanced dispersibility, electromagnetic characteristics and physical characteristics.

Beside the examples, when the special urethane resins according to the present invention were used together with the other components of a cobalt-adsorbed magnetic powder or a magnetite magnetic powder etc. as the magnetic powder and vinyl chloride-vinylidenechloride copolymer, vinyl chloride-acrylonitrile copolymer or nitrocellulose etc. as the binder resin component, magnetic recording tapes having the similar excellent characteristics were obtained.

I claim:

1. In a magnetic recording medium which comprises a substrate coated with a magnetic layer comprising a magnetic powder and a binder, the improvement characterized in that said binder comprises, as a rubber component, a urethane resin comprising the reaction product of a $C_4$-$C_8$ alkylenediisocyanate as an isocyanate component and a $C_3$-$C_{12}$ alkyleneglycol as a polyol component.

2. The magnetic recording medium according to claim 1 wherein said urethane resin is a urethane prepolymer.

3. The magnetic recording medium according to claim 1 or 2 wherein said alkylenediisocyanate is hexamethylenediisocyanate.

4. The magnetic recording medium according to claim 1 or 2 wherein said alkyleneglycol is 1,4-butanediol, or 1,6-hexanediol or a mixture thereof.

5. The magnetic recording medium according to claim 1 or 2 wherein said urethane resin comprises the reaction product of hexamethylenediisocyanate and 1,4-butanediol.

6. The magnetic recording medium according to claim 1 or 2 wherein said urethane resin comprises the reaction product of hexamethylenediisocyanate and 1,6-hexanediol.

* * * * *